Figure 1:
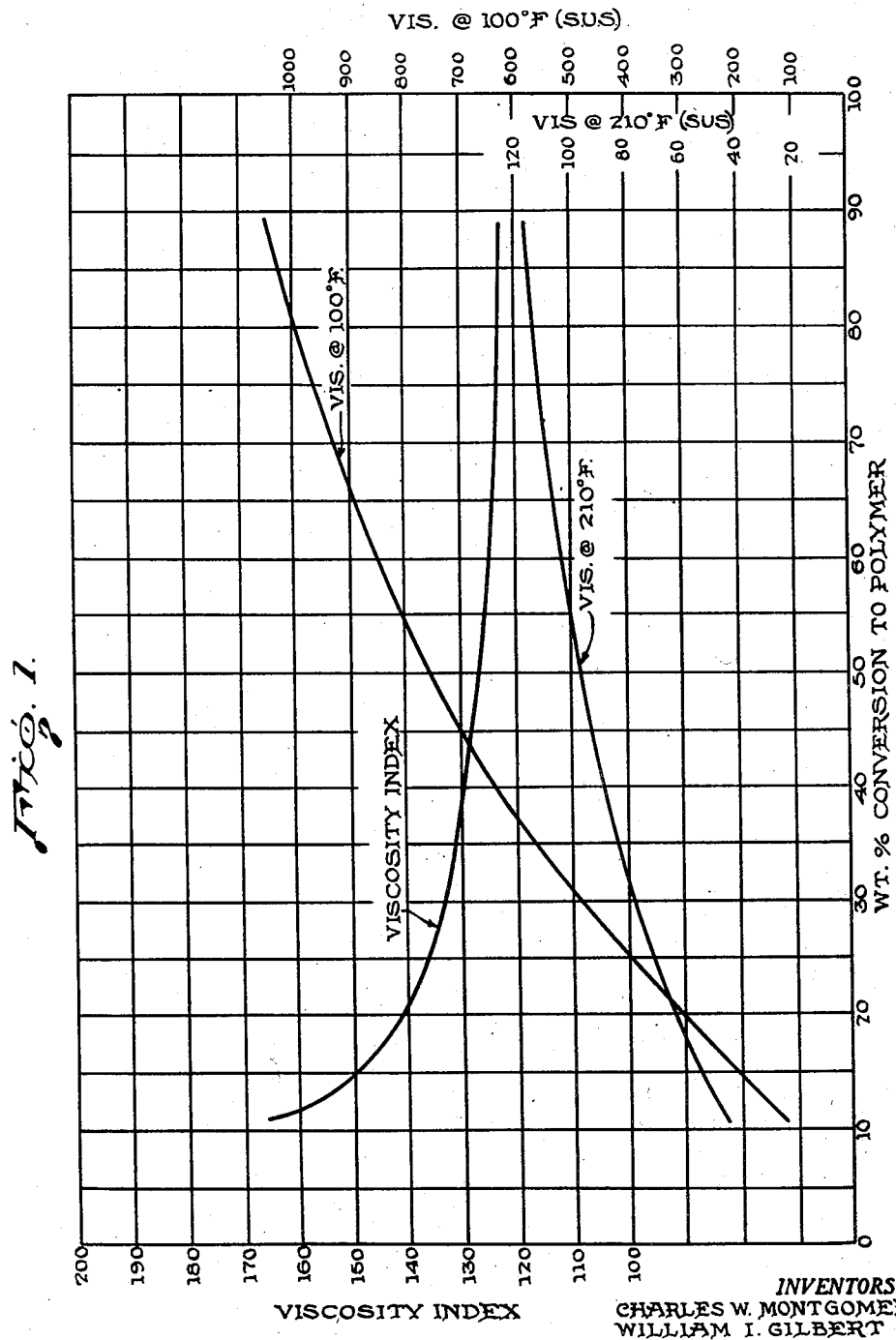

INVENTORS
CHARLES W. MONTGOMERY
WILLIAM I. GILBERT
ROBERT E. KLINE
BY A. M. Houghton
their ATTORNEY

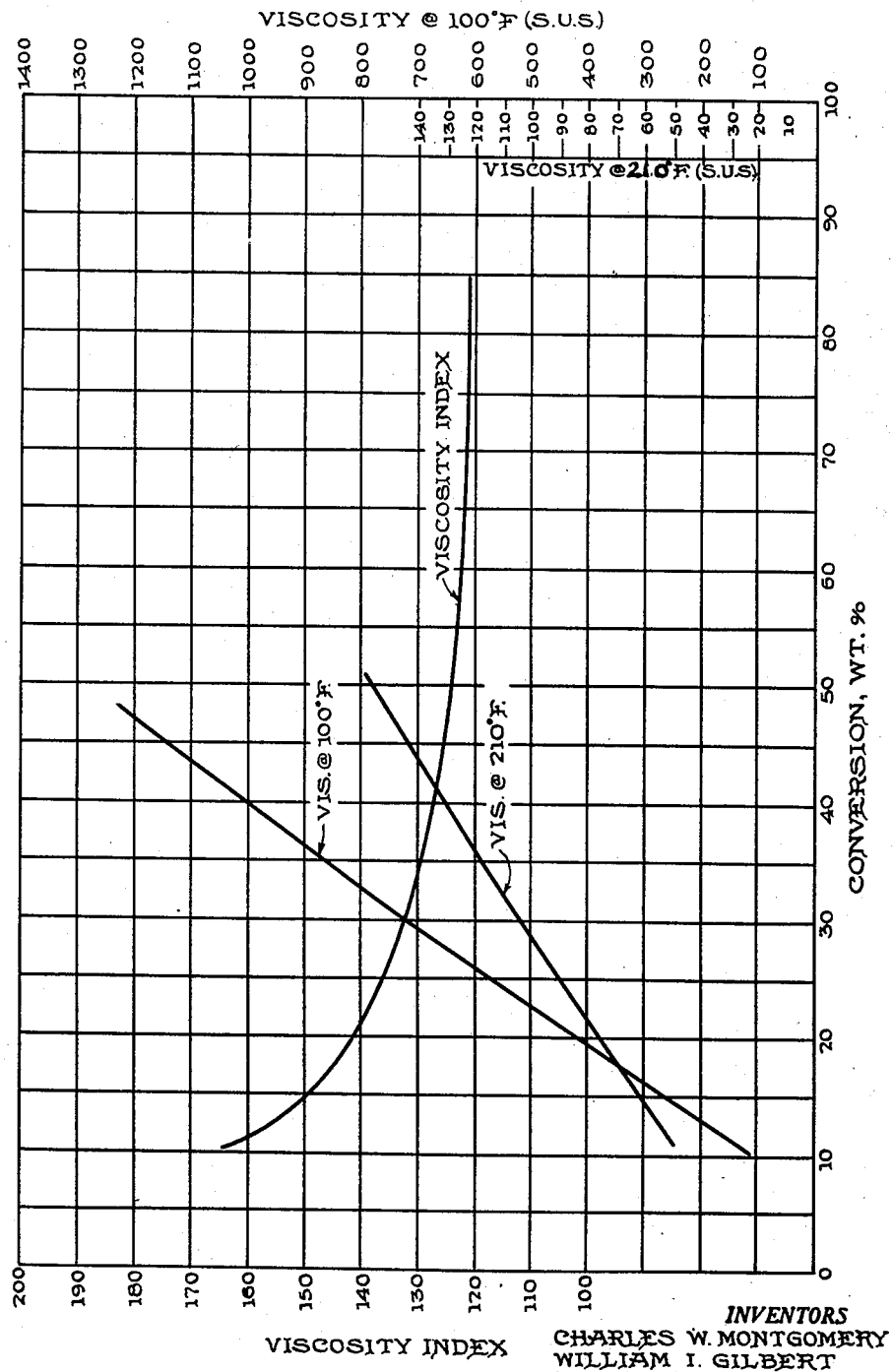

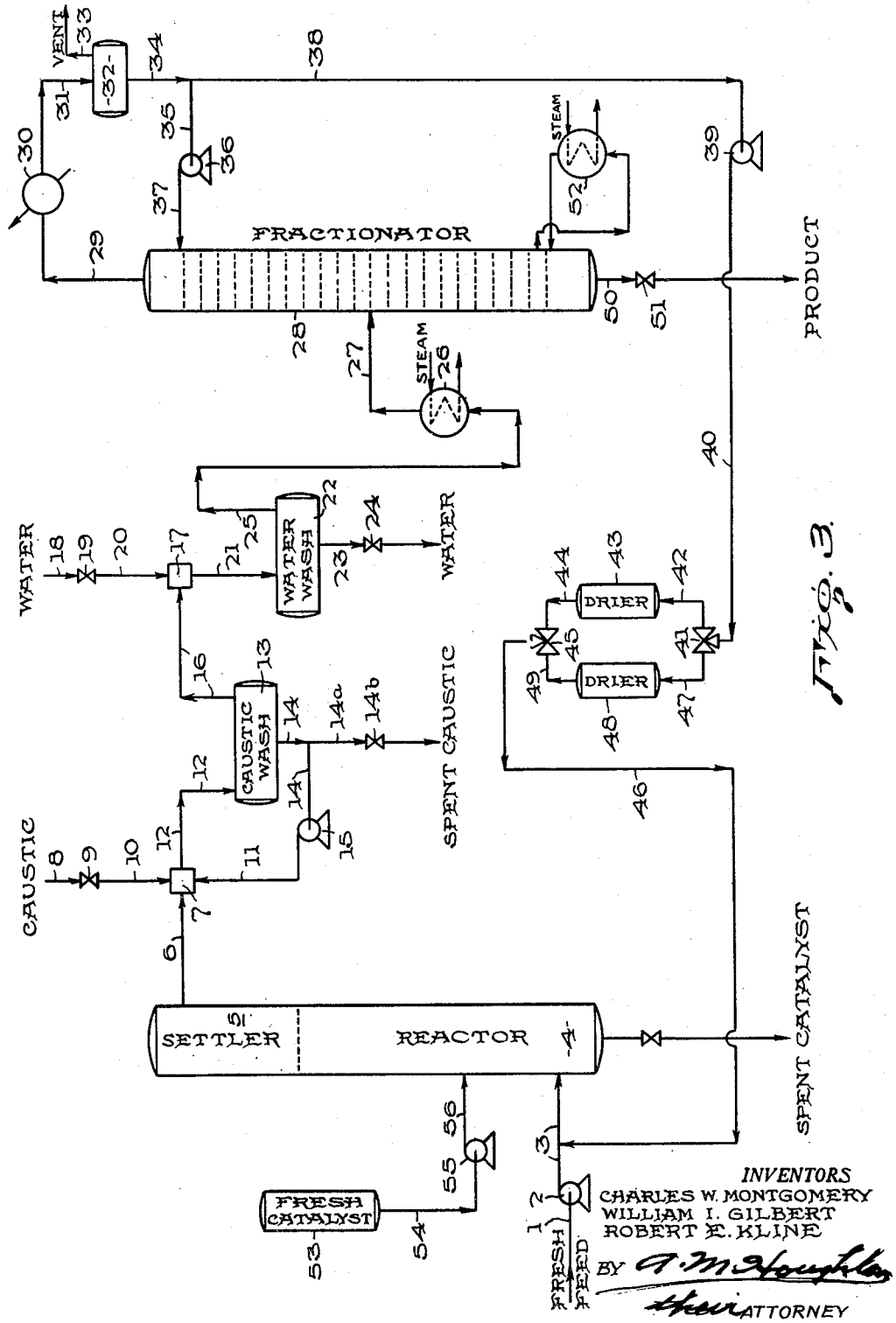

Patented July 10, 1951

2,559,984

UNITED STATES PATENT OFFICE 2,559,984

PROCESS OF PREPARING POLYMERIC LUBRICATING OILS

Charles W. Montgomery and William I. Gilbert, Oakmont, and Robert E. Kline, Penn Township, Allegheny County, Pa., assignors to Gulf Research & Development Company, Pittsburgh, Pa., a corporation of Delaware Application November 21, 1947, Serial No. 787,280

13 Claims. (Cl. 260—683.15)

This invention relates to the polymerization of olefins to produce polymers of lubricating oil character having improved physical properties, particularly as regards viscosity index.

It has been previously known to convert olefins into higher polymers having lubricating properties by treatment with polymerization catalysts of the halide type such as metal halides, or metal halide complex combinations with organic compounds. However, previous investigators have been mainly interested in obtaining relatively high conversion. The properties of polymers thus obtained have not been satisfactory in all respects.

This invention has for its object to provide a process for polymerizing olefins whereby a polymer having a high viscosity index and good lubricating properties can be obtained. Another object is to provide an improved continuous process for preparing olefin polymers by contacting them with a polymerization catalyst of the halide type. A further object is to provide a process for conversion of higher olefins into lubricating oils having a relatively high viscosity index. Other objects will appear hereinafter.

These and other objects are accomplished by our invention by contacting an olefin which contains at least 3 carbon atoms and which is in liquid phase, with a halide type polymerization catalyst and limiting the extent of polymerization to between about 10 and 20 per cent conversion of monomer to polymer. The unconverted olefin can be separated from the polymer and reused in subsequent conversions.

In the following description we have given several of the preferred embodiments of our invention but it is to be understood that these are set forth for the purpose of illustration and not in limitation thereof.

In the accompanying drawings Figure 1 illustrates the results of our invention when carried out in a batch fashion;

Figure 2 illustrates the results when carried out in a continuous fashion with a fixed bed catalyst; and Figure 3 illustrates suitable apparatus for continuous operation using sludge-type catalyst.

The olefin utilized in our invention may be obtained from any source. For instance, the olefins obtained in the Fischer-Tropsch synthesis constitute a valuable starting material. Olefins from the cracking of petroleum or petroleum wax may be utilized as may also olefins obtained by dehydration of alcohols. Other mixtures containing high proportions of straight chain olefins are useful. The utilization of 1-olefins is preferred as is also the use of normally liquid olefins. The use of mixtures containing high proportions of 1-olefins or those with double bond near the end of the chain is desirable.

The catalyst may be any halide polymerization catalyst such as aluminum, zirconium or zinc chlorides or hydrogen or boron fluorides or complexes between such halides and organic compounds. Such complexes are of value in continuous processes since they are liquids which permit efficient contacting of the olefin in the polymerization zone. The sludge catalysts are advantageous because they have uniform activity, constant physical state, permit easy control of temperature, are easily handled, and do not lose activity due to becoming coated with sludge (as in the case of solid catalysts). A very satisfactory sludge catalyst may be prepared by continuously stirring a mixture of aluminum chloride and alkylate bottoms (the hydrocarbons boiling above gasoline which are formed by reacting an olefin with a paraffin hydrocarbon in the presence of aluminum chloride) at elevated temperature. For instance, 30 parts alkylate bottoms and 70 parts of aluminum chloride are reacted for three hours at 175° F. in a glass reaction vessel. Complexes of aluminum chloride with other hydrocarbons or with other substances such as nitrobenzene, alcohols, ethers, ketones and esters may be used as the sludge-type polymerization catalyst.

The polymerization may be carried out either in batch or continuous manner. Thus the catalyst may be added to the olefin and the mixture heated to polymerization temperature or permitted to stand at the temperature of mixing until the required degree of polymerization has taken place. The operation is preferably carried out in a continuous manner. As indicated above, this may be accomplished by contacting the sludge-type catalyst with a stream of the olefin in the polymerization zone. It may also be accomplished by passing the olefin into contact with or through a fixed bed of the catalyst.

When using a sludge catalyst it is advantageous to combine the catalyst with the olefin in the polymerization zone. It is also advantageous to pump the olefin into the bottom of the sludge layer in the reaction zone so that it passes upwardly through the sludge. Various means may be used for obtaining the efficient contact between the sludge and the olefin, i. e., the olefin may be introduced into the sludge layer through a spray nozzle or a plurality of orifices, or the sludge layer may be efficiently stirred. In some cases it is advantageous to add fresh sludge catalyst to the olefin stream to make up for losses in the reaction zone.

The polymerization can be quite readily controlled to limit it to about 10 to 20 per cent conversion by regulating the time and/or temperature of contact with the catalyst. In other words, the per cent conversion is largely determined by the time and temperature. With high temperatures the contact time should be very short and with low temperatures longer periods may be used. The per cent conversion can be determined in a preliminary or test run by analysis of the reaction products from the test run in which the time and temperature are known. Subsequent conversions can be repeated under these same conditions with time and temperature adjusted in accordance with the data obtained in the test run, to result in the desired conversion of 10 to 20 per cent. Temperatures of between about −20° and 40° C. can be used and temperatures between about 0° and 20° C. are especially advantageous. The time and temperature required for conversion of the higher olefins is considerably less than required for conversion of lower olefins.

The pressure should be such as to maintain the olefin in liquid phase. If the olefin is normally liquid at the temperature used ordinary atmospheric pressure is satisfactory. Also the use of super-atmospheric pressures can be avoided in the case of gaseous olefins by dissolving them in a solvent, such as an inert hydrocarbon, for instance heptane to form the liquid phase and contacting this solution with the catalyst in the above described manner.

The reaction products are then treated to separate the polymer from the unpolymerized olefin. This is accomplished in any conventional manner, such as by fractionation. The unpolymerized olefin is not adversely affected by the exposure to the polymerization conditions and can be reused in the process. As a matter of fact, the reused olefin sometimes gives a product having a slightly higher viscosity index than the fresh olefin which had not been previously exposed to the polymerization conditions.

*Example I.*—Octene-1 was polymerized at atmospheric pressure and 35° to 40° C. in a glass apparatus using 2 per cent by weight of granular aluminum chloride as the catalyst. By allowing the reaction to proceed for various lengths of time the difference percentage conversions were obtained. A standardized procedure for quenching the reaction and working up the product was employed. Conversion was based upon the yield of product boiling above 130° C. (4° C. above the highest boiling octene). The following table summarizes the data from the most pertinent batch runs.

*Table I*

| Run No. | Charge | Time, min. | Conv., wt. Per Cent | Viscosity 100° F. | SUS 210° F. | Viscosity Index | Pour Point, °F. |
|---|---|---|---|---|---|---|---|
| 1 | Fresh octene-1 | 15 | 11.0 | 120 | 44.9 | 165 | <−70 |
| 2 | Fresh octene-1 | 30 | 21.4 | 322 | 64.5 | 140 | <−70 |
| 3 | Fresh octene-1 | 45 | 33.8 | 548 | 82.6 | 132 | <−70 |
| 4 | Fresh octene-1 | 360 | 83.9 | 1,048 | 115 | 123 | −50 |
| 5 | Octene from run 1 | 15 | 7.7 | 67.7 | 38.2 | 193 | <−70 |
| 6 | Fresh octene-1 | 15 | 9.5 | 127 | 45.5 | 161 | <−70 |
| 7 | Octene from run 6 | 15 | 9.3 | 73.6 | 39.1 | 195 | <−70 |
| 8 | Octene from runs 5 and 7 | 15 | 10.0 | 113 | 43.9 | 166 | <−70 |

Runs 1, 2, 3 and 4 show that as the conversion to polymer is increased the viscosity index decreases. The above data also show that the viscosity decreases in the low conversion (high V. I.) region. This is also shown by the curves in Fig. 1 of the drawings. Runs 5, 7 and 8 show the effect of recycling the unconverted octene upon the yield and quality of the polymer. Yields in the second-pass runs (5 and 7) check within the limits of reproducibility the yields of the first-pass runs (1 and 6) and also indicate an advantage in recycling of the unpolymerized olefin. A third-pass run (8) shows no decrease in yield and viscosity index.

*Example II.*—A fixed bed of granular aluminum chloride was arranged in a flow system equipped with a jacket for circulating a coolant in the area of the fixed bed. Octene-1 was fed from a calibrated container through the catalyst in the flow system. Experiments in this apparatus have shown that conversions in the neighborhood of 10 to 20 per cent can be obtained at a temperature of about 5 to 10° C. and a liquid space velocity in the range 2 to 3 volumes of olefin per volume of catalyst per hour. The curve in Fig. 2 for viscosity index versus conversion was plotted from data obtained in this experiment and is practically identical with the V. I.-conversion curve in Fig. 1. It will be noted, however, that the viscosity curves in Fig. 2 have been shifted to somewhat higher values which is an additional advantage over batch operation.

Table II summarizes the data for several typical runs in this flow system.

*Table II*

| Run No. | 1 | 2 | 3 | 4 | 5 | 6 | 7 | 8 | 9 |
|---|---|---|---|---|---|---|---|---|---|
| Temperature: | | | | | | | | | |
| Range, °C | 36–49 | 10–24 | 8–23 | 7–26 | 8–20 | 5–10 | 5–11 | 5–18 | 6–41 |
| Average, °C | 42 | 15 | 11 | 13 | 15 | 9 | 10 | 12 | 20 |
| Space Velocity, v./v./hr | 2.3 | 2.4 | 3.9 | 3.2 | 3.3 | 2.5 | 2.6 | 2.6 | 2.6 |
| Feed Rate, liters/hr | 0.29 | 0.30 | 0.31 | 0.25 | 0.26 | 0.13 | 0.13 | 0.13 | 0.13 |
| Throughput (for run) | 2.3 | 4.9 | 3.3 | 6.5 | 6.6 | 10.1 | 10.2 | 10.2 | 10.2 |
| Throughput (total on catalyst) | 2.3 | 7.3 | 3.3 | 6.5 | 13.1 | 10.1 | 20.3 | 30.6 | 40.8 |
| Conversion, weight per cent | 58.1 | 30.0 | 10.2 | 21.2 | 29.9 | 17.2 | 23.1 | 35.6 | 70.6 |
| *Product Inspection* | | | | | | | | | |
| Gravity, °API | 36.7 | 36.9 | 40.1 | 37.7 | 34.6 | 38.2 | 38.8 | 37.1 | 36.1 |
| Viscosity, SUS: | | | | | | | | | |
| 100° F | 2,007 | 997 | 131 | 453 | 691 | 305 | 246 | 580 | 1,116 |
| 210° F | 187 | 120 | 46.7 | 79.6 | 102 | 65.6 | 61.5 | 92.6 | 135 |
| Viscosity Index | 122 | 128 | 165 | 140 | 135 | 146 | 153 | 138 | 129 |
| Pour Point, °F | −40 | −65 | <−70 | <−70 | <−70 | <−70 | <−70 | <−70 | <−70 |
| Bromine No | 10.5 | 15.6 | 33.7 | 20.6 | 18.5 | 21.5 | 20.9 | 19.0 | 16.9 |
| Refractive Index, 20° C | 1.4711 | 1.4687 | 1.4583 | 1.4643 | 1.4664 | 1.4618 | 1.4595 | 1.4650 | 1.4687 |

Runs 1 and 2 show the effect of temperature upon the percent conversion and viscosity index. Lower temperatures reduce the conversion and yield a lighter polymer having a higher viscosity index. In run 3, the space velocity was increased over run 2 and the linear velocity held constant which also resulted in a reduction in conversion and an increase in viscosity index. Runs 4 and 5 are over the same batch of catalyst and show that conversion increases with increasing throughput. Runs 6 to 9, inclusive, were made to further investigate the effect of catalyst age (throughput) upon the conversion and quality of the product. It will be noted that the average catalyst temperature increased with throughput and that the conversion increased and the viscosity index decreased at the same time. Apparently the catalyst becomes more active with age and means of holding the conversion within the desired range, such as adequate cooling, should be used.

*Example III.*—Several runs were made in which butene-1 was polymerized at atmospheric pressure over granular aluminum chloride in the flow reactor mentioned in Example II, using n-heptane as the solvent. In the first four runs the butene-1 and n-heptane were charged in approximately equimolar ratio at various temperatures between 1° and 30° C. Runs 5 and 6 were made at 26° C. at variable butene-heptane charge rates. The following table summarizes the results.

*Butene-1 polymerization runs (heptane solvent)*

| Run No. | 1 | 2 | 3 | 4 | 5 | 6 |
|---|---|---|---|---|---|---|
| Temp., ° C.: | | | | | | |
| Range | 21–43 | 2–19 | 10–17 | 1–3 | 20–34 | 21–32 |
| Average | 30 | 7 | 15 | 1 | 26 | 26 |
| Charge Rate, mols./hr.: | | | | | | |
| Butene-1 | 0.871 | 0.871 | 0.876 | 0.878 | 1.75 | 1.79 |
| n-heptane | 0.855 | 0.807 | 0.799 | 0.834 | 0.807 | 1.60 |
| Space Velocity, V/V. Hr.: | | | | | | |
| Butene-1 (gaseous) | 390 | 390 | 392 | 394 | 786 | 800 |
| n-heptane (liquid) | 2.48 | 2.33 | 2.33 | 2.43 | 2.35 | 4.65 |
| Conversion, weight per cent of butene-1 polymer 130° C | 83.0 | 13.7 | 40.7 | 4.7 | 27.8 | 21.9 |
| Gravity, °API | 25.4 | 36.4 | 35.6 | 38.1 | 35.3 | 35.8 |
| Sp. Gr. 60/60° F | 0.9018 | 0.8428 | 0.8473 | 0.8343 | 0.8484 | 0.8458 |
| Viscosity, SUS: | | | | | | |
| 100° F | 2882 | 417 | 894 | 134 | 1239 | 696 |
| 210° F | 153 | 61.6 | 81.8 | 43.0 | 94.9 | 72.9 |
| Viscosity Index | 87 | 109 | 92 | 121 | 88 | 94 |
| Pour Point, ° F | −15 | | +35 | | −45 | +20 |

Although the range of viscosity indexes is not as great as with octene polymers, a plot of V. I. versus conversion shows that the V. I. increases as the conversion decreases.

Referring to Fig. 3, a fresh feed consisting of olefins having more than two carbon atoms such as propylene, butylene, amylenes, etc., is introduced through line 1, pump 2, and line 3 to the polymerization zone of reactor 4 where the feed is contacted with a sludge-type aluminum chloride catalyst and passes upward through the reaction zone at a temperature between about 0° C. and about 20° C. into the settling zone 5 of the reaction chamber. In the settling zone any entrained sludge will drop out of the hydrocarbon stream and be returned to the reaction zone. The partially polymerized hydrocarbon stream then passes from the settling zone 5 through line 6 into a mixing chamber 7 where it is contacted with fresh caustic solution admitted through line 8, valve 9 and line 10. Recycle caustic solution coming from settling tank 13 through line 14 and pump 15 is also admitted through line 11 to mixing chamber 7. The hydrocarbon caustic mixture then passes through line 12 into a caustic settling tank 13 where the caustic solution is separated from the hydrocarbon material and passes out the separator into line 14, the caustic being recycled through pump 15 or discarded through line 14a and valve 14b. The partially polymerized olefin product passes from the caustic separator through line 16 into a mixing chamber 17 where it is admixed with water admitted to chamber 17, through line 18, valve 19 and line 20. The hydrocarbon-water mixture passes through line 21 into water separator 22 through line 25, passing through heat exchanger 26, and entering through line 27 and fractionater 28. The overhead from the fractionator leaves through line 29, passes to condenser 30, through line 31 into accumulator 32 where it condenses. Noncondensible gases may be vented from accumulator 32 into line 34, part of it being recycled to line 35, pump 36, and line 37 to fractionator 28 where it serves to maintain the proper reflux ratio. The remainder of the condensate passes through line 38, pump 39, line 40, valve 41 and line 42 to a dryer 43. From dryer 43 through line 44, valve 45, and line 46 the condensate is recycled to line 3 where it is admixed with fresh feed and is sent through the polymerization process again. Alternatively when dryer 43 is being regenerated the condensate passing through valve 41 may enter line 47 and pass through dryer 48, line 49, valve 45 and line 46. The bottoms product from the fractionator is withdrawn through line 50 and valve 51, after first passing through steam reboiler 52.

What we claim is:

1. The process of preparing a polymeric lubricating oil having a high viscosity index which comprises continuously contacting an olefin, which contains at least 3 carbon atoms, while in the liquid phase with a halide polymerization catalyst at a temperature of between about −20° and 40° C., and polymerizing at least about 10 per cent but not more than about 20 per cent monomer to polymer.

2. The process of preparing a polymeric lubricating oil having a high viscosity index which comprises contacting an olefin, which contains at least 3 carbon atoms, while in the liquid phase with a halide polymerization catalyst at a temperature of between about −20° and 40° C., and polymerizing at least about 10 per cent but not more than about 20 per cent monomer to polymer.

3. The process of preparing a polymeric lubricating oil having a high viscosity index which comprises contacting an olefin which contains at least 3 carbon atoms, while in the liquid phase, with a halide polymerization catalyst at a temperature between about 0° and 20° C., and polymerizing at least about 10 per cent but not more than about 20 per cent monomer to polymer.

4. The process of preparing a polymeric lubricating oil which has a high viscosity index which comprises continuously contacting an olefin, which contains at least 3 carbon atoms, while in the liquid phase with a halide polymerization catalyst at a temperature of between about 0° and 20° C., and polymerizing at least about 10 per cent but not more than about 20 per cent monomer to polymer.

5. The process of preparing a polymeric lubricating oil which has a high viscosity index which comprises continuously contacting an olefin, which contains at least 3 carbon atoms, while in the liquid phase with a halide polymerization catalyst at a temperature of between about —20° and 40° C., polymerizing at least about 10 per cent but not more than about 20 per cent monomer to polymer, separating unpolymerized olefin from the reaction mixture and reusing the separated olefin in the process.

6. The process of preparing a polymeric lubricating oil having a high viscosity index from an olefin which contains at least 3 carbon atoms which comprises contacting the olefin in liquid phase with a metal halide-organic complex polymerization catalyst at a temperature between about —20° and 40° C., and polymerizing at least about 10 per cent but not more than about 20 per cent monomer to polymer.

7. The process of preparing a polymeric lubricating oil having a high viscosity index from a gaseous olefin which contains at least 3 carbon atoms which comprises contacting the olefin while in liquid phase with a metal halide-organic complex polymerization catalyst under superatmospheric pressure at a temperature between about —20° and 40° C., and polymerizing at least about 10 per cent but not more than about 20 per cent monomer to polymer.

8. The process of preparing a polymeric lubricating oil having a high viscosity index from a gaseous olefin which contains at least 3 carbon atoms which comprises dissolving the olefin in an inert solvent contacting this solution with a metal halide-organic complex polymerization catalyst at a temperature between about —20° C. and 40° C. and polymerizing at least about 10 per cent but not more than about 20 per cent monomer to polymer.

9. The process of preparing a polymeric lubricating oil having a high viscosity index by polymerization of octene-1 which comprises contacting octene-1 while in the liquid phase, with a halide polymerization catalyst at a temperature of between about —20° and 40° C., and polymerizing at least about 10 per cent but not more than about 20 per cent monomer to polymer.

10. The process of preparing a polymeric lubricating oil having a high viscosity index which comprises continuously contacting octene-1 while in liquid phase with aluminum chloride at a temperature of between about —20° and 40° C., polymerizing at least about 10 per cent but not more than about 20 per cent monomer to polymer, separating polymerized octene-1 from unpolymerized octene-1 and reusing the unpolymerized octene-1 in the process.

11. The process of preparing a polymeric lubricating oil having a high viscosity index which comprises continuously contacting octene-1, while in liquid phase with aluminum chloride at a temperature of between about 0° and 20° C., polymerizing at least about 10 per cent but not more than about 20 per cent monomer to polymer, separating polymerized octene-1 from unpolymerized octene-1 and reusing the unpolymerized octene-1 in the process.

12. The process of preparing a polymeric lubricating oil having a high viscosity index by polymerization of an olefin which contains at least three carbon atoms, which comprises contacting the olefin in liquid phase with aluminum chloride polymerization catalyst at a temperature of between about —20° and 40° C., and polymerizing at least about 10 per cent but not more than about 20 per cent monomer to polymer.

13. The process of preparing a polymeric lubricating oil having a high viscosity index, which comprises contacting an olefin which contains at least three carbon atoms while in the liquid phase with aluminum chloride polymerization catalyst at a temperature of between about —20 and 40° C. and polymerizing at least about 10 per cent but not more than about 20 per cent monomer to polymer.

CHARLES W. MONTGOMERY.
WILLIAM I. GILBERT
ROBERT E. KLINE.

REFERENCES CITED

The following references are of record in the file of this patent:

UNITED STATES PATENTS

| Number | Name | Date |
|---|---|---|
| 2,085,535 | Langedijk et al. | June 29, 1937 |
| 2,377,266 | Reid | May 29, 1945 |
| 2,389,240 | Reid | Nov. 20, 1945 |
| 2,482,008 | Kleber | Sept. 13, 1949 |

Certificate of Correction

Patent No. 2,559,984                                               July 10, 1951

CHARLES W. MONTGOMERY ET AL.

It is hereby certified that error appears in the printed specification of the above numbered patent requiring correction as follows:

Column 6, line 3, after the word "out" insert *of*; line 18, after "accumulator 32" insert *through line 33. The condensate passes from accumulator 32*;

and that the said Letters Patent should be read as corrected above, so that the same may conform to the record of the case in the Patent Office.

Signed and sealed this 28th day of August, A. D. 1951.

[SEAL]

THOMAS F. MURPHY,
*Assistant Commissioner of Patents.*